(12) United States Patent
Zeng et al.

(10) Patent No.: US 11,542,172 B1
(45) Date of Patent: Jan. 3, 2023

(54) METHODS FOR PREPARING HIGH-PURITY BOEHMITE AND POROUS GAMMA-ALUMINA NANO-POWDER

(71) Applicant: Qinghai Institute of Salt Lakes, Chinese Academy of Sciences, Xining (CN)

(72) Inventors: Jinbo Zeng, Xining (CN); Chunxi Hai, Xining (CN); Yue Shen, Xining (CN); Yuan Zhou, Xining (CN); Xiang Li, Xining (CN); Xiufeng Ren, Xining (CN); Yanxia Sun, Xining (CN); Xia Shen, Xining (CN); Chengrong Zhang, Xining (CN); Jianghua Liu, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 17/873,651

(22) Filed: Jul. 26, 2022

(30) Foreign Application Priority Data

Nov. 1, 2021 (CN) .......................... 202111282643.6

(51) Int. Cl.
*C01F 7/30* (2022.01)
*C01F 7/441* (2022.01)

(52) U.S. Cl.
CPC ................. *C01F 7/30* (2013.01); *C01F 7/441* (2013.01); *C01P 2002/72* (2013.01); *C01P 2004/03* (2013.01); *C01P 2004/64* (2013.01); *C01P 2006/80* (2013.01)

(58) Field of Classification Search
CPC .................................. C01F 7/30; C01F 7/441
See application file for complete search history.

(56) References Cited

FOREIGN PATENT DOCUMENTS

| CN | 107298453 A | 10/2017 |
|---|---|---|
| CN | 108569713 A | 9/2018 |
| CN | 109336145 A | 2/2019 |
| CN | 113526534 A | 10/2021 |
| IN | 40/2017 | 6/2017 |
| JP | 2003238150 A | 8/2003 |
| JP | 2003292819 A | 10/2003 |

*Primary Examiner* — James A Fiorito
(74) *Attorney, Agent, or Firm* — Stuart H. Mayer; Mayer & Williams PC

(57) ABSTRACT

Disclosed are methods for preparing high-purity boehmite and porous gamma-alumina nano-powder, comprising: adding aluminum isopropoxide into water and stirring the aluminum isopropoxide added water, then adding aluminum hydroxide generated by hydrolysis of high-purity aluminum powder into that stirred water, stirring that aluminum hydroxide added water to obtain a mixed system; carrying out hydrothermal reaction on the mixed system, performing centrifuging, washing, drying and crushing to the reacted mixed system, obtaining high-purity boehmite; calcining the high-purity boehmite to obtain porous gamma (γ)-alumina nano-powder. By strictly controlling the addition of isopropanolic aluminum and the temperature as well as the duration of the hydrothermal reaction, the product boehmite γ-AlOOH obtains good character in terms of crystalline structure, purity, morphology and dispersion; γ-$Al_2O_3$ obtained after calcining remains basically the same morphology as that of boehmite powder with good powder dispersion and no major changes.

4 Claims, 21 Drawing Sheets

US 11,542,172 B1

METHODS FOR PREPARING HIGH-PURITY BOEHMITE AND POROUS GAMMA-ALUMINA NANO-POWDER

CROSS-REFERENCE TO RELATED APPLICATION

This application claims priority to Chinese Patent Application No. 202111282643.6, filed on Nov. 1, 2021, the contents of which are hereby incorporated by reference.

TECHNICAL FIELD

The present application relates to the technical field of nano-powder preparation, and in particular to methods for preparing high-purity boehmite and porous gamma-alumina (γ-alumina) nano-powder.

BACKGROUND

Over the recent years, much attention has been paid to the preparation of highly dispersed nano-alumina powders in view of their promising applications in the chemical, ceramic and battery industries. Currently various aluminum precursors are prepared by methods of gel-sol, precipitation and alcohol salt hydrolysis in the actual production process. Among these methods, the method of gel-sol is less popular since requiring highly in terms of equipment, raw materials and storage; the method of precipitation uncontrollably causes the problem of uneven particle sizes; and the method of alcohol salt hydrolysis exploits the solubility of metal alcohol salts in organic solvents and their easy decomposition into corresponding oxides or hydrated oxides in water to prepare alumina, although the method can be widely used in preparing ultrafine powders, so it is too expensive to be applied on a large scale.

Upon investigation, it is found that hydrothermal reaction and high temperature calcining techniques are more commonly used to prepare nano alumina powder materials. Shengnuo Optoelectronic Technology(QH) Co., LTD. prepares aluminum hydroxide by hydrolysis of high-purity aluminum powder; but the prepared aluminum hydroxide precursors with this hydrolysis method are subjected to uncontrollable particle size growth, rapid crystallisation and poor dispersion as a result of the rather active nature of aluminum powder; besides, the hydrolysis method can only produce a mixture of boehmite (γ-AlOOH) and Al(OH)$_3$, which is prone to agglomeration after calcining at high temperatures, resulting in uncontrollable material morphology and particle sizes, and difficulty in obtaining a single crystalline alumina. Consequently, it is one of the hot topics of research to successfully prepare highly dispersed alumina nano-powders with crystalline structure and single composition by calcining at a later stage.

SUMMARY

It is an objective of the present application to provide methods for preparing high-purity boehmite and porous gamma-alumina (γ-Al$_2$O$_3$, or γ-alumina) nano-powder; according to the present application, an alumina powder with a single crystalline form is prepared under optimized conditions, thereby alleviating, to a certain extent, the difficulties of alumina agglomeration, uncontrollable morphology and particle size after high temperature calcining, and advancing the industrialization of high-purity boehmite and porous alumina at the same time.

To achieve the above objectives, the present application provides the following technical schemes:

a method for preparing high-purity boehmite, comprising the following steps: adding aluminum isopropoxide into water and stirring the aluminum isopropoxide added water, then adding aluminum hydroxide generated by hydrolysis of high-purity aluminum powder into that stirred water, stirring that aluminum hydroxide added water to obtain a mixed system; adding the mixed system into a reaction kettle for hydrothermal reaction, performing centrifuging, washing, drying and crushing to the reacted mixed system, obtaining high-purity boehmite;

optionally, the aluminum isopropoxide, aluminum hydroxide and water are in a mass-volume ratio of (5-20) gram (g):30 g:100 milliliter (mL);

optionally, the aluminum isopropoxide is added into water and the aluminum isopropoxide added water is stirred for 3 hours (h) at room temperature; the aluminum hydroxide is added into that stirred water and that aluminum hydroxide added water is stirred for 1 h at room temperature;

optionally, the hydrothermal reaction is performed at 170 degree Celsius (° C.) for 9 h;

optionally, the washing is to wash the reacted mixed system after centrifuging with deionized water to neutrality, and then wash the neutral mixed system with absolute ethanol for 1-2 times;

optionally, the drying is to dry a precipitate in a vacuum drying oven at 60° C., and then cool the precipitate to room temperature; the crushing is carried out by grinding the cooled precipitate in a mortar, with a particle size requirement of less than or equal to 5 percent (%) by mass of the material on a sieve when passing through a 100 mesh sieve;

a high-purity boehmite prepared by the above method for preparing high-purity boehmite;

a method for preparing porous γ-alumina nano-powder, comprising the following steps: calcining the high-purity boehmite to obtain porous γ-alumina nano-powder;

optionally, the calcining is carried out in a muffle furnace at a calcining temperature of 430-700° C. for 2 h; and a porous γ-alumina nano-powder prepared by the above method for preparing porous γ-alumina nano-powder.

The present application discloses the following technical effects:

according to the present application, by hydrothermal reaction of isopropanolic aluminum and addition of aluminum hydroxide generated by hydrolysis of high-purity aluminum powder, a precursor of boehmite with uniform particle size distribution is prepared, and the boehmite is then calcined to obtain nano alumina powder; the method, to a certain extent, alleviates the difficulties of easy agglomeration, uncontrollable morphology and particle size of alumina prepared by hydrolysis of aluminum hydroxide generated by high-purity aluminum powder by high temperature calcining, and reduces the powder agglomeration effect; by strictly controlling the amount of isopropanolic aluminum added and the temperature as well as the duration of the hydrothermal reaction, the product boehmite (γ-AlOOH) obtained from the reaction forms good crystalline structure, purity, morphology and dispersion; the low temperature calcining in a muffle furnace is strictly controlled under a temperature range of 430-700° C., thereby effectively controlling the crystal growth of γ-AlOOH, and the γ-Al$_2$O$_3$ remains the same morphology as that of the boehmite powder without major changes, and the powder dispersion is satisfactory.

BRIEF DESCRIPTION OF THE DRAWINGS

For a clearer illustration of the technical schemes in the embodiments of the present application or in the prior art, a brief description of the accompanying drawings to be used in the embodiments is given below. It is obvious that the accompanying drawings in the following description are only some embodiments of the present application and that other accompanying drawings can be obtained based on these drawings without any creative work for a person of ordinary skill in the art.

DETAILED DESCRIPTION OF THE EMBODIMENTS

Figure 1:
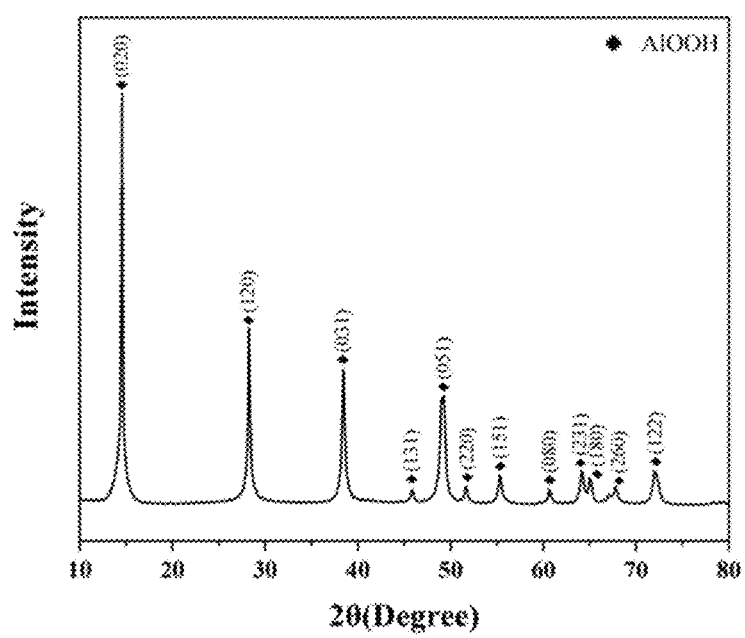
FIG. 1 shows an X-ray diffraction (XRD) pattern of high-purity boehmite in Embodiment 1.

Now various exemplary embodiments of the present application will be described in detail. This detailed description should not be taken as a limitation of the present application, but should be understood as a more detailed description of some aspects, characteristics and embodiments of the present application.

It should be understood that the terms mentioned in the present application are only used to describe specific embodiments, and are not used to limit the present application. In addition, for the numerical range in the present application, it should be understood that each intermediate value between the upper limit and the lower limit of the range is also specifically disclosed. Every smaller range between any stated value or the intermediate value within the stated range and any other stated value or the intermediate value within the stated range is also included in the present application. The upper and lower limits of these smaller ranges can be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein can be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many modifications and changes can be made to the specific embodiments of the present specification. Other embodiments obtained from the description of the present application will be obvious to the skilled person. The description and embodiments of that application are only exemplary.

As used in this paper, the terms "comprising", "including", "having" and "containing" are all open terms, meaning including but not limited to.

Room temperature as referred to in the present application is defined as indoor temperature and is well known to those skilled in the art and hence will not be repeated hereafter; in particular, it should be noted that the room temperature referred to in the present application is 25 degree Celsius (° C.).

Aluminum isopropoxide in following embodiments is a commercially available product of analytical purity.

Aluminum hydroxide in following embodiments is a commercial product (high-purity aluminum hydroxide powder produced by Shengnuo Optoelectronic Technology(QH) Co., LTD.) produced by hydrolysis of high-purity aluminum powder, with a purity of over 99.99 percent (%) and a particle size distribution of D (diameter) 10=2.837 Micrometres (μm), D50=9.472 μm and D90=44.273 μm.

Embodiment 1

Aluminum isopropoxide of 5 gram (g) is added into water of 100 milliliter (mL), the aluminum isopropoxide added water is stirred at room temperature for 3 hours (h); the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol once to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that passes through the sieve is high-purity boehmite; and the high-purity boehmite is calcined at 430° C. for 2 h to obtain porous gamma-alumina (γ-alumina, or γ-Al$_2$O$_3$) nano-powder.

Figure 2:
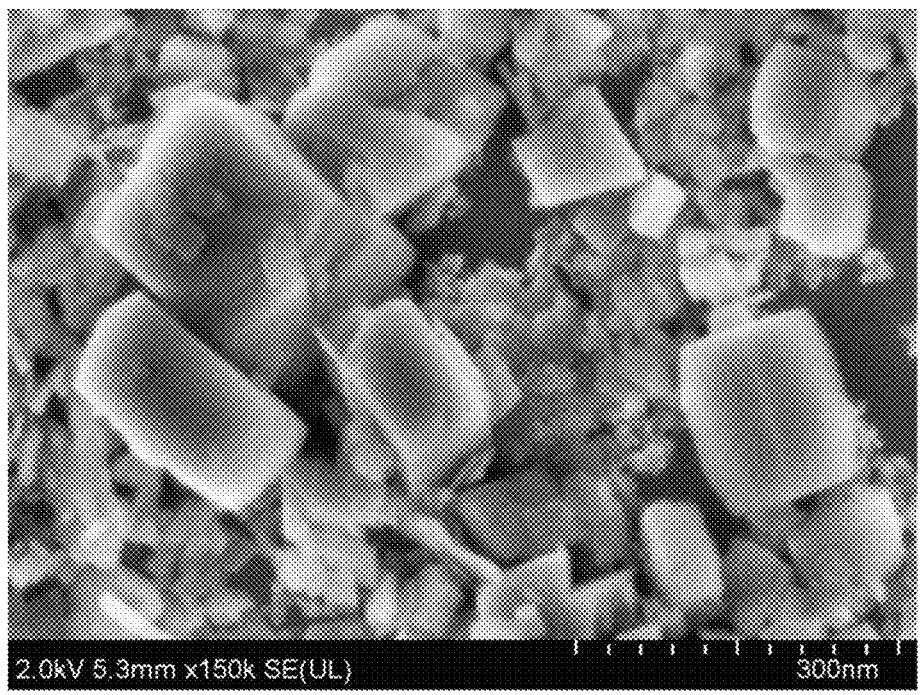
FIG. 2 shows a scanning electron microscope (SEM) image of high-purity boehmite in Embodiment 1.
Figure 3:
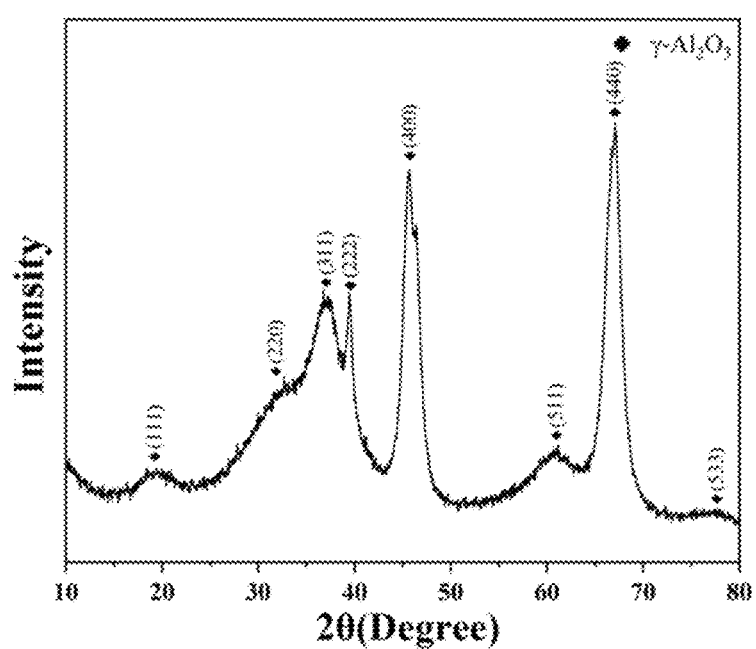
FIG. 3 shows an XRD pattern of porous gamma-alumina (γ-alumina) nano-powder in Embodiment 1.
Figure 4:
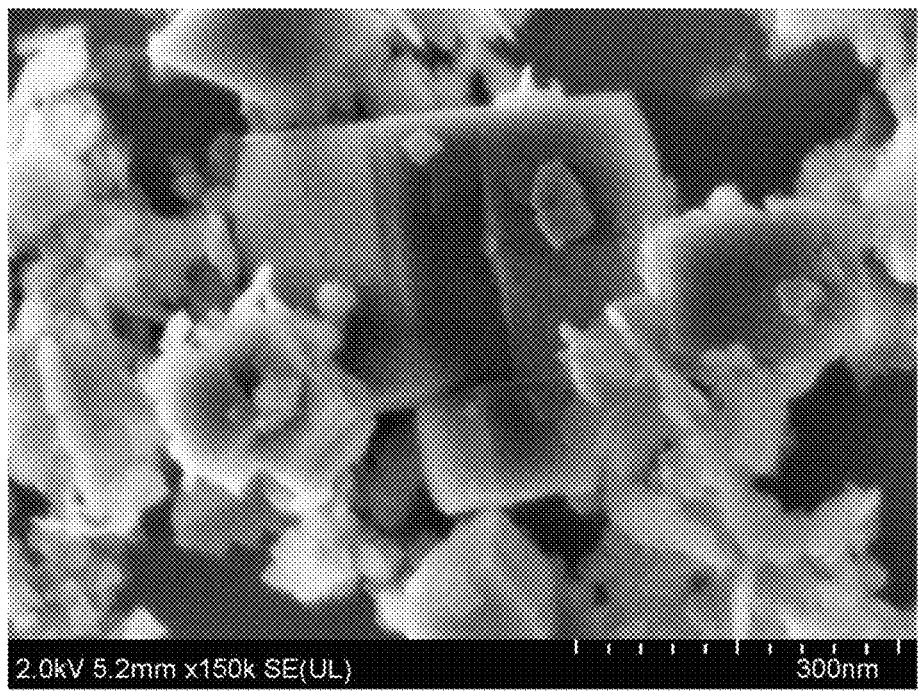
FIG. 4 shows a SEM picture of porous γ-alumina nano-powder in Embodiment 1.
Figure 5:
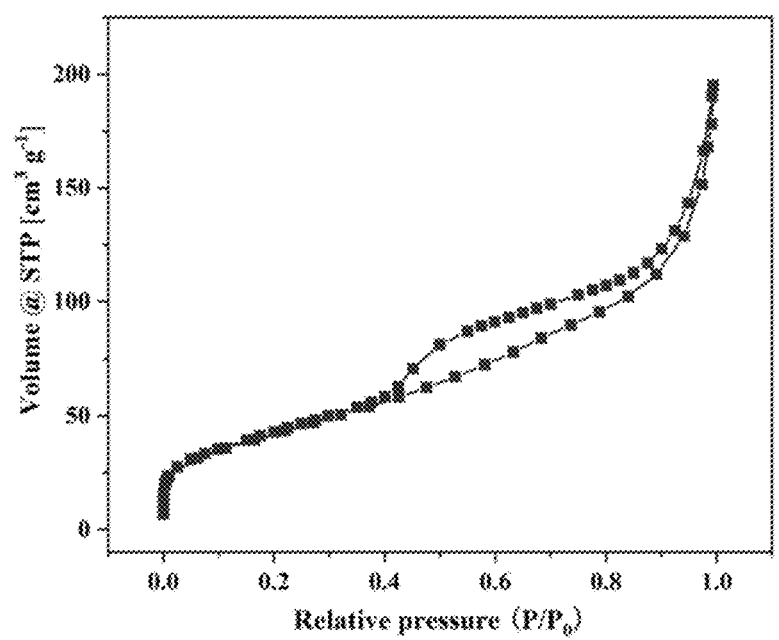
FIG. 5 illustrates the nitrogen adsorption of porous γ-alumina nano-powder in Embodiment 1.
Figure 6:
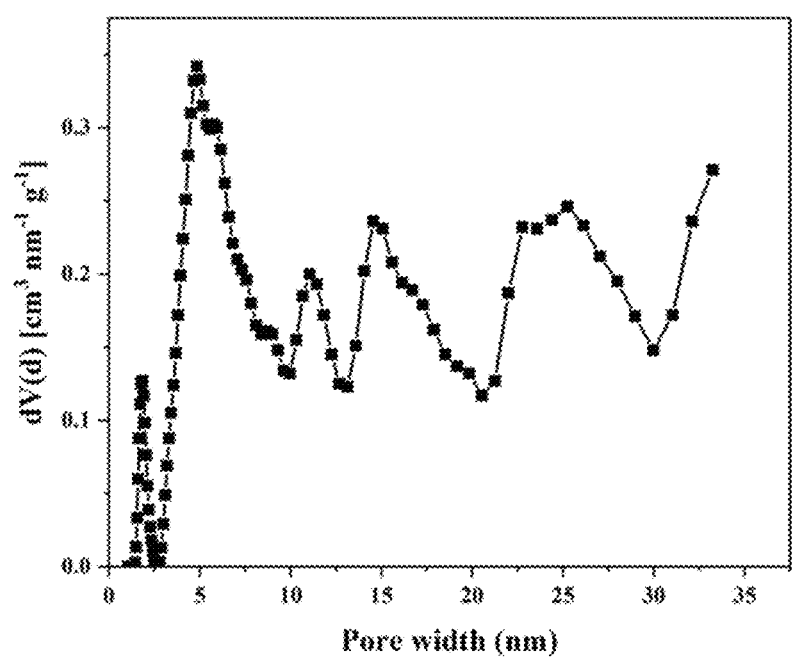
FIG. 6 illustrates a pore size distribution of porous γ-alumina nano-powder in Embodiment 1.

The porous γ-alumina nano-powder of this embodiment is tested by X-ray diffraction (XRD for short) and scanning electron microscopy (SEM for short), and the XRD and SEM plots are shown in FIGS. 1 and 2, respectively; the porous γ-alumina nano-powder of this embodiment is tested by XRD, SEM, nitrogen adsorption-desorption, as well as pore size distribution, with the XRD and SEM plots are shown in FIG. 3 and FIG. 4 respectively, and nitrogen adsorption-desorption and pore size distribution plots are shown in FIG. 5 and FIG. 6 respectively.

As illustrated in FIG. 1, diffraction peaks of crystalline planes representing the rhombohedral system of boehmite γ-AlOOH ((JCPDS Card No.:83-2384) (020), (120), (031), (131), (051), (220), (151), (080), (231), (180), (260), (122)) appear at 2θ=14.5°, 28.2°, 38.3°, 45.8°, 48.9°, 51.6°, 55.2°, 60.6°, 64.0°, 66.1°, 68.5°, 72.55°, so the sample prepared by this method is γ-AlOOH.

As shown in FIG. 2, the boehmite powder prepared by this method has very good dispersibility with a regular rectangular or square morphology of 100-200 nano-meter (nm) and a lamellar morphology with a particle size of approximately 40 nm.

As can be seen from FIG. 3, diffraction peaks of crystalline planes representing cubic crystalline alumina γ-$Al_2O_3$ ((JCPDS Card No.:79-1558) (111), (220), (311), (222), (400), (511), (440), (535)) appear at 2θ=19.4°, 32.0°, 37.7°, 39.4°, 45.8°, 60.8°, 66.8°, 79.4° due to calcining at 430° C. in a muffle furnace, so the presence of γ-$Al_2O_3$ in the sample prepared by this method is proven.

FIG. 4 shows that the morphology of γ-$Al_2O_3$ after calcining at 430° C. in the muffle furnace is basically the same as that of the boehmite powder, with good powder dispersion and no significant changes.

FIG. 5 shows that the γ-$Al_2O_3$ is mesoporous after calcining at 430° C. in the muffle furnace, and the pore sizes are mainly 5, 11, 15 and 25 nm.

Embodiment 2

Aluminum isopropoxide of 10 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 430° C. for 2 h to obtain porous γ-alumina nano-powder.

Figure 7:
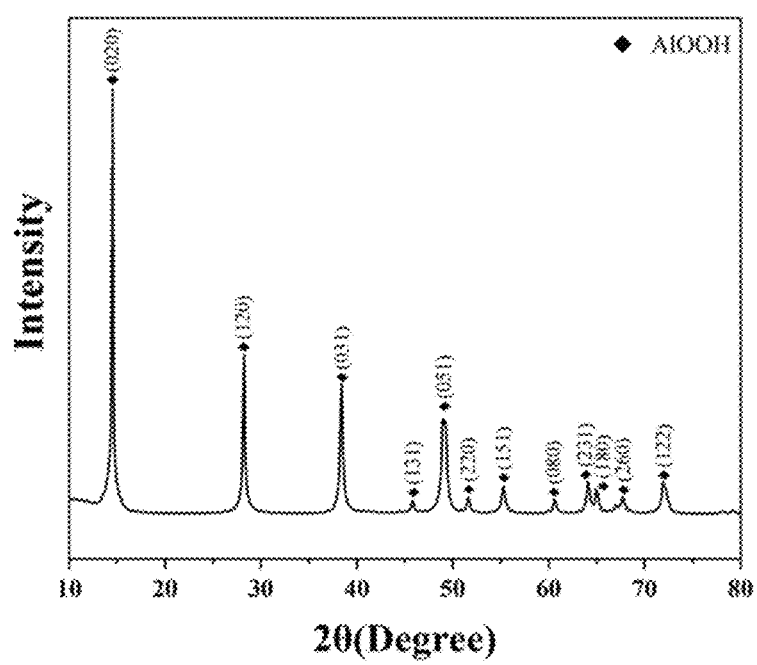
FIG. 7 shows an XRD pattern of high-purity boehmite in Embodiment 2.
Figure 8:
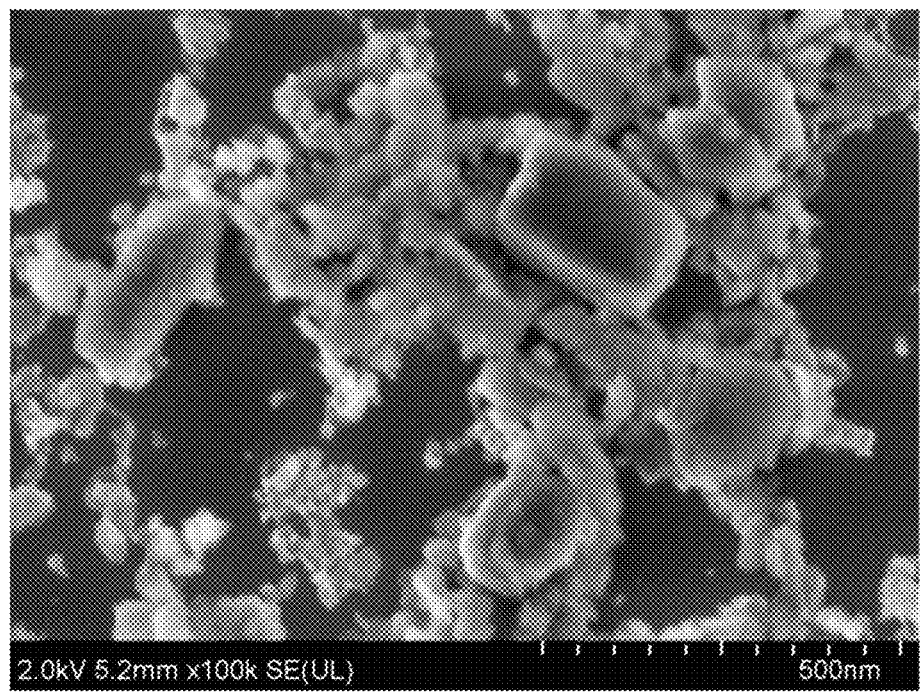
FIG. 8 shows a SEM image of high-purity boehmite in Embodiment 2.

The high-purity boehmite of this embodiment is tested by XRD and SEM, and its XRD and SEM pictures are shown in FIG. 7 and FIG. 8 respectively.

As can be seen from FIG. 7, diffraction peaks of crystalline planes representing rhombohedrite γ-AlOOH ((JCPDS Card No.:83-2384) (020), (120), (031), (131), (051), (220), (151), (080), (231), (180), (260), (122)) appear at 2θ=14.5°, 28.2°, 38.3°, 45.8°, 48.9°, 51.6°, 55.2°, 60.6°, 64.0°, 66.1°, 68.5°, 72.5°, so the sample prepared by this method is γ-AlOOH.

As shown in FIG. 8, the regular rectangular or square shaped particles around 200 nm are reduced after increasing the addition of aluminum isopropoxide, with basically a lamellar shape of around 50 nm.

Embodiment 3

Aluminum isopropoxide of 15 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 430° C. for 2 h to obtain porous γ-alumina nano-powder.

Figure 9:
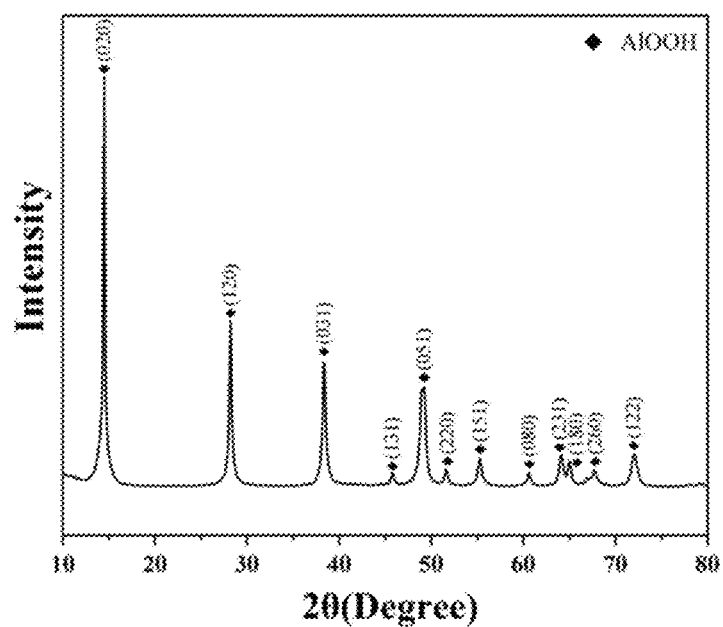
FIG. 9 shows an XRD pattern of high-purity boehmite in Embodiment 3.
Figure 10:
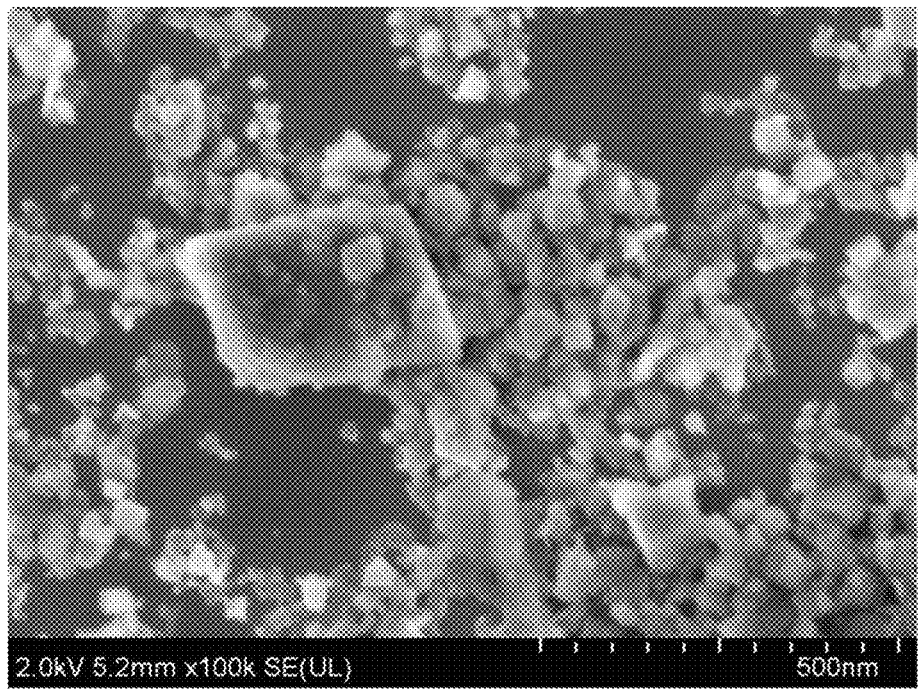
FIG. 10 shows a SEM image of high-purity boehmite in Embodiment 3.

The high-purity boehmite of this embodiment is tested by XRD and SEM, and the XRD and SEM pictures are shown in FIG. 9 and FIG. 10 respectively.

As can be seen from FIG. 9, diffraction peaks of crystalline planes representing rhombohedrite γ-AlOOH ((JCPDS Card No.:83-2384) (020), (120), (031), (131), (051), (220), (151), (080), (231), (180), (260), (122)) appear at 2θ=14.5°, 28.2°, 38.3°, 45.8°, 48.9°, 51.6°, 55.2°, 60.6°, 64.0°, 66.1°, 68.5°, 72.5°, so the sample prepared by this method is γ-AlOOH.

FIG. 10 shows that regular rectangular or square shaped particles decrease and lamellar shaped particles increase as a result of continuing to increase the amount of aluminum isopropoxide added.

Embodiment 4

Aluminum isopropoxide of 20 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 430° C. for 2 h to obtain porous γ-alumina nano-powder.

Figure 11:
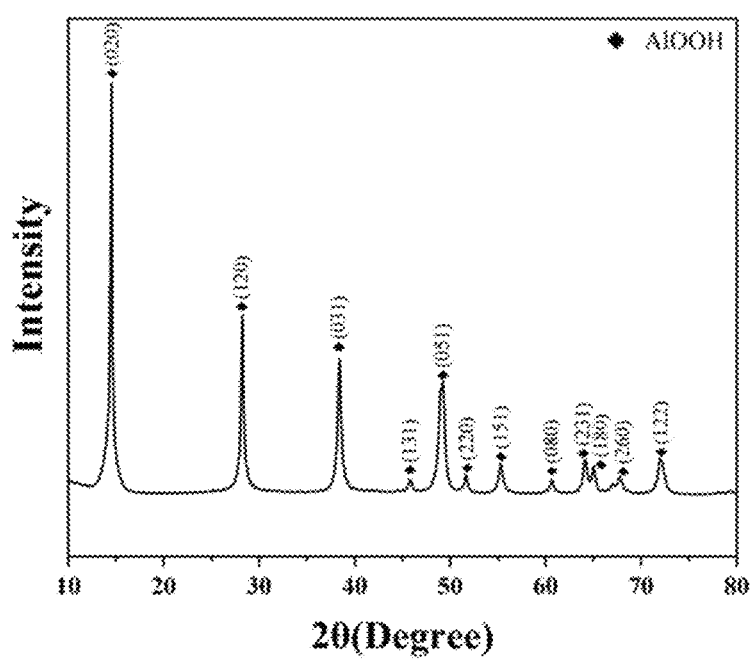
FIG. 11 shows an XRD pattern of high-purity boehmite in Embodiment 4.
Figure 12:
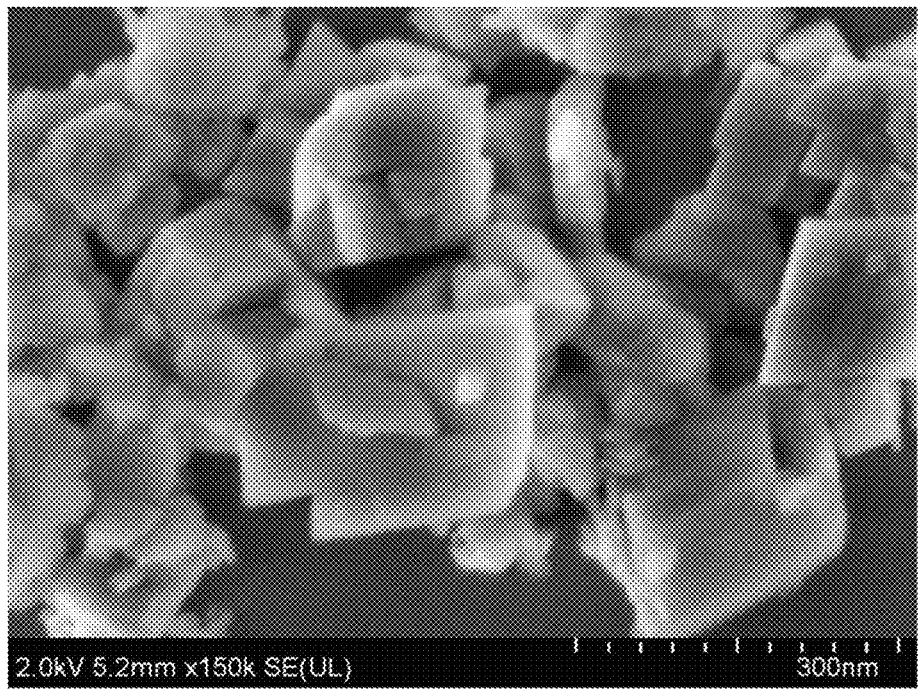
FIG. 12 is a SEM image of high-purity boehmite in Embodiment 4.

The high-purity boehmite of this embodiment is tested by XRD and SEM, and the XRD and SEM pictures are shown in FIG. 11 and FIG. 12 respectively.

As shown in FIG. 11, diffraction peaks of crystalline planes representing rhombohedrite γ-AlOOH ((JCPDS Card No.:83-2384) (020), (120), (031), (131), (051), (220), (151), (080), (231), (180), (260), (122)) appear at 2θ=14.5°, 28.2°, 38.3°, 45.8°, 48.9°, 51.6°, 55.2°, 60.6°, 64.0°, 66.1°, 68.5°, 72.5°, so that the sample prepared by this method is γ-AlOOH.

As shown in FIG. 12, regular rectangular or square shaped particles decrease and lamellar shaped particles increase as a result of continuing to increase the amount of aluminum isopropoxide added.

Embodiment 5

Aluminum isopropoxide of 5 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 500° C. for 2 h to obtain porous γ-alumina nano-powder.

Figure 13:
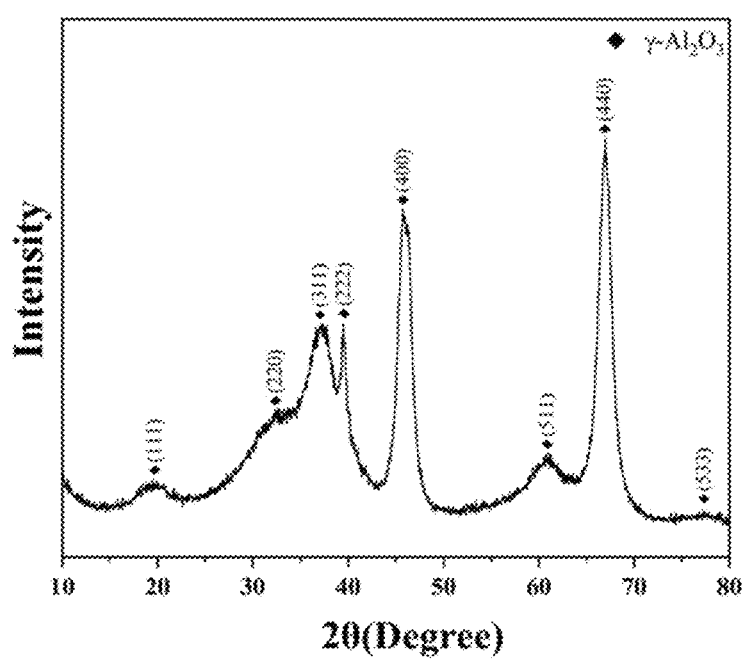
FIG. 13 shows an XRD pattern of porous γ-alumina nano-powder in Embodiment 5.
Figure 14:
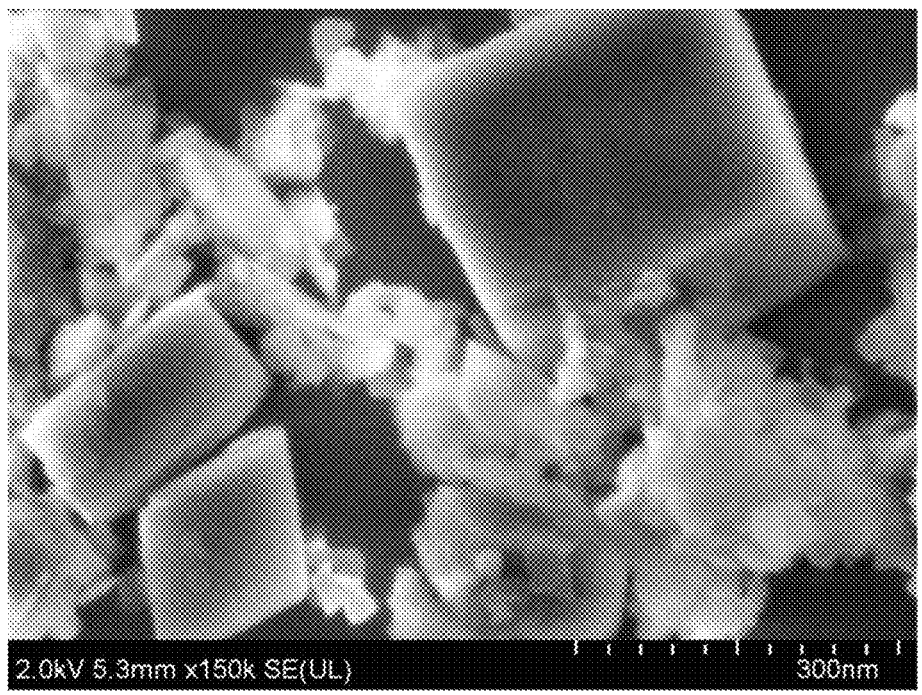
FIG. 14 shows a SEM picture of porous γ-alumina nano-powder in Embodiment 5.
Figure 15:
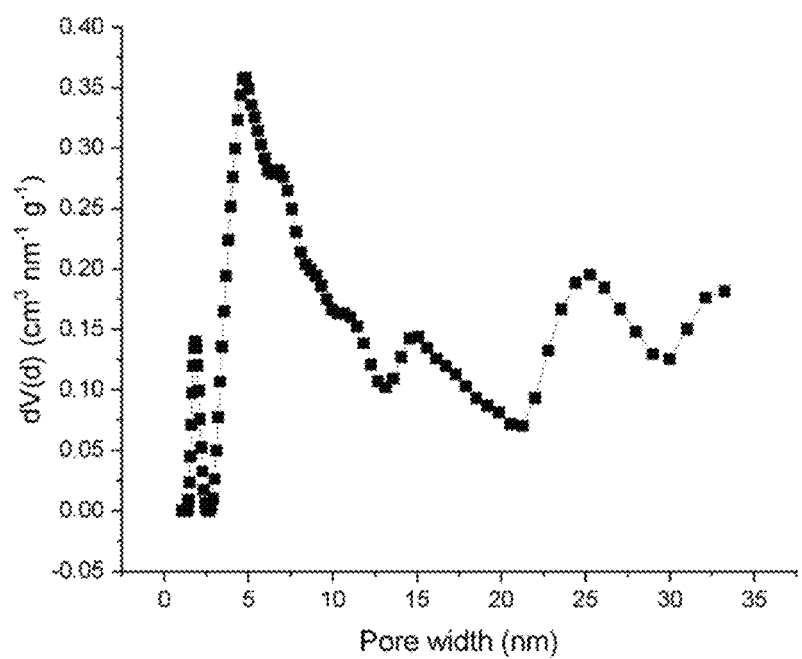
FIG. 15 illustrates a pore size distribution of porous γ-alumina nano-powder in Embodiment 5.

The product after calcining at 500° C. in this embodiment is subjected to XRD, SEM and pore size distribution tests, with the XRD picture shown in FIG. 13, the SEM picture in FIG. 14 and the pore size distribution in FIG. 15.

As shown in FIG. 13, diffraction peaks of crystalline planes representing cubic crystalline alumina $\gamma$-$Al_2O_3$ ((JCPDS Card No.:79-1558) (111), (220), (311), (222), (400), (511), (440), (535)) appear at 2θ=19.4°, 32.0°, 37.7°, 39.4°, 45.8°, 60.8°, 66.8°, 79.4° due to calcining at 500° C. in the muffle furnace, so the sample prepared by this method is still $\gamma$-$Al_2O_3$.

As can be seen in FIG. 14, the $\gamma$-$Al_2O_3$ powder is well dispersed with morphology remaining essentially the same as that of the boehmite powder, and no significant grain growth occurs; obvious micro-pores can be seen on the surface of the regular orthorhombic particles; the pore size is mainly about 6 nm, as shown in FIG. 15.

Embodiment 6

Aluminum isopropoxide of 5 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 600° C. for 2 h to obtain porous γ-alumina nano-powder.

The product calcined at 600° C. in this embodiment is tested by XRD, SEM and pore size distribution. See FIG. 16 for XRD, FIG. 17 for SEM and FIG. 18 for pore size distribution.

Figure 16:
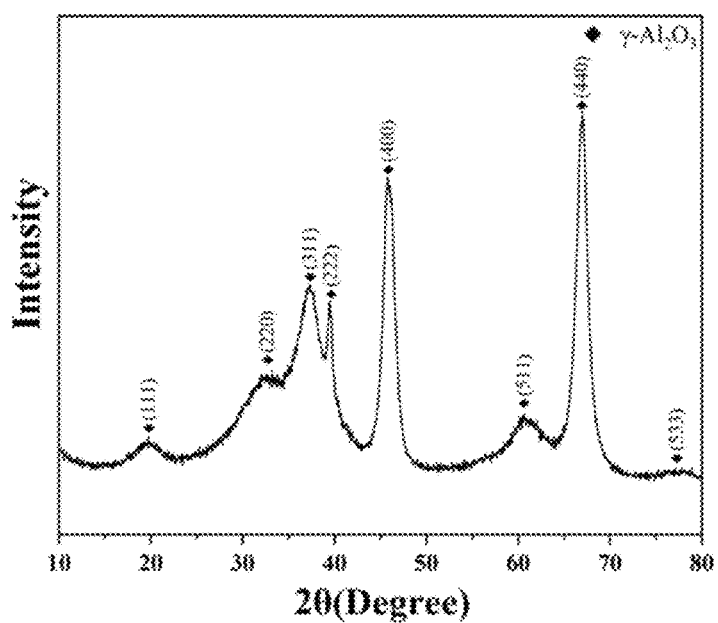
FIG. 16 shows an XRD pattern of porous γ-alumina nano-powder in Embodiment 6.

As shown in FIG. 16, diffraction peaks of crystalline planes representing cubic crystalline alumina $\gamma$-$Al_2O_3$ ((JCPDS Card No.:79-1558) (111), (220), (311), (222), (400), (511), (440), (535)) appear at 2θ=19.4°, 32.0°, 37.7°, 39.4°, 45.8°, 60.8°, 66.8°, 79.4° due to calcining at 600° C. in the muffle furnace, so the sample prepared by this method is still $\gamma$-$Al_2O_3$ without miscellaneous peaks present.

Figure 17:
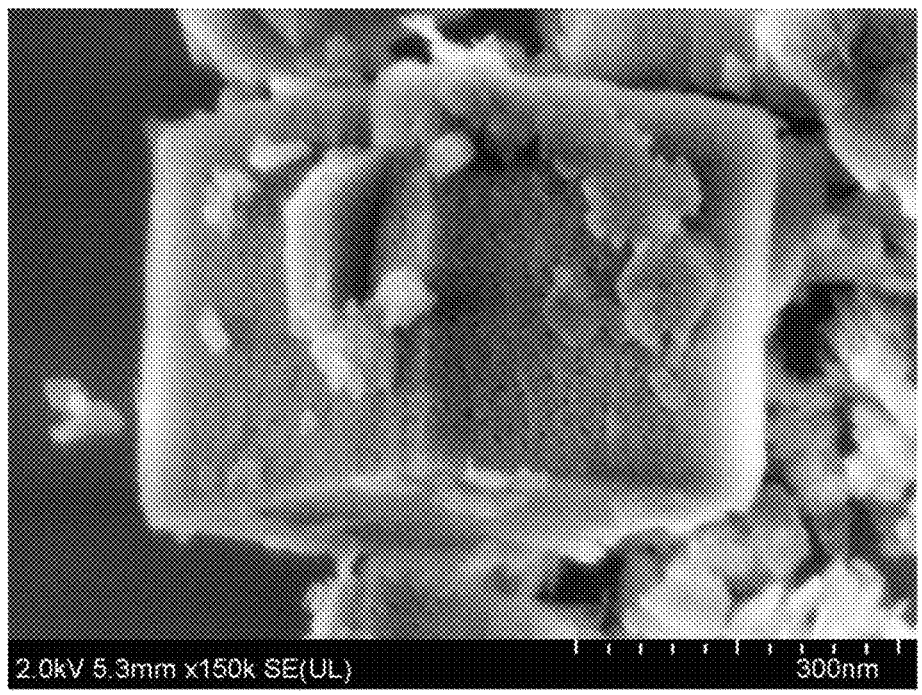
FIG. 17 shows a SEM picture of porous γ-alumina nano-powder in Embodiment 6.
Figure 18:
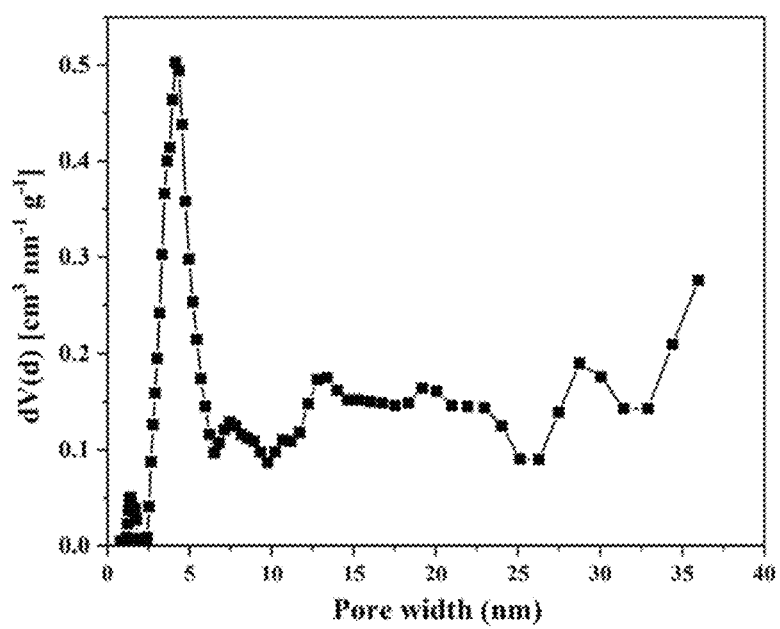
FIG. 18 illustrates a pore size distribution of porous γ-alumina nano-powder in Embodiment 6.

As can be seen in FIG. 17, the $\gamma$-$Al_2O_3$ powder is well dispersed, with a regular orthorhombic shape crystal size of approximately 300 nm and obvious micro-pores on the surface of the particles. The pore size is mainly around 5 nm as shown in FIG. 18.

Embodiment 7

Aluminum isopropoxide of 5 g is added into water of 100 mL, the aluminum isopropoxide added water is stirred at room temperature for 3 h; the stirred water is added with 30 g aluminum hydroxide and stirred at room temperature for 1 h to obtain a mixed system; the mixed system is added into a reaction kettle for hydrothermal reaction at 170° C. for 9 h to obtain a product; the product is then centrifuged and washed with deionized water to be neutral (pH of 7), followed by washing with absolute ethanol twice to obtain a precipitate; the precipitate is dried at 60° C. and then cooled to room temperature, followed by grinding in a mortar, where only 5% by mass of the ground precipitate is left on a sieve when the ground precipitate is passing through a 100 mesh sieve; the ground precipitate that pass through the sieve is high-purity boehmite; and the high-purity boehmite is calcined at 700° C. for 2 h to obtain porous γ-alumina nano-powder.

The product calcined at 700° C. in this embodiment is tested by XRD, SEM and pore size distribution. See FIG. 19 for XRD, FIG. 20 for SEM and FIG. 21 for pore size distribution.

Figure 19:
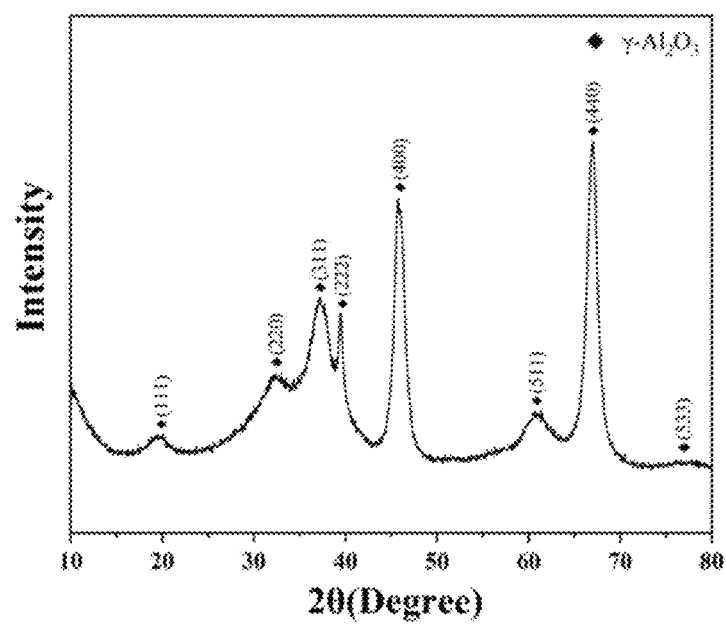
FIG. 19 shows an XRD pattern of porous γ-alumina nano-powder in Embodiment 7.

As shown in FIG. 19, diffraction peaks of crystalline planes representing cubic crystalline alumina $\gamma$-$Al_2O_3$ ((JCPDS Card No.:79-1558) (111), (220), (311), (222), (400), (511), (440), (535)) appear at 2θ=19.4°, 32.0°, 37.7°, 39.4°, 45.8°, 60.8°, 66.8°, 79.4° due to calcining at 700° C. in the muffle furnace, so the sample prepared by this method is still $\gamma$-$Al_2O_3$ without miscellaneous peaks present.

Figure 20:
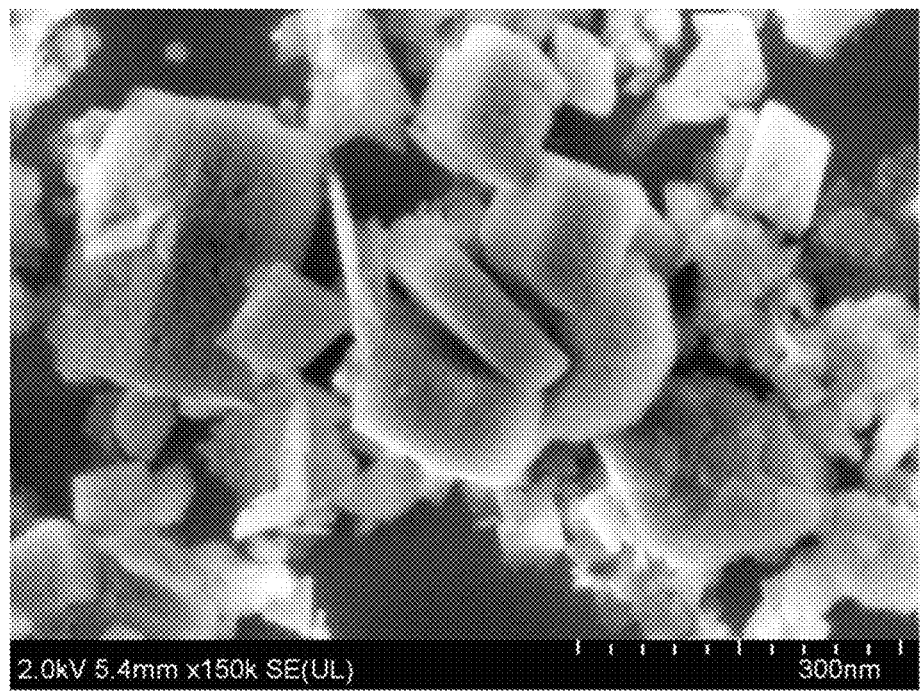
FIG. 20 shows a SEM picture of porous γ-alumina nano-powder in Embodiment 7.
Figure 21:
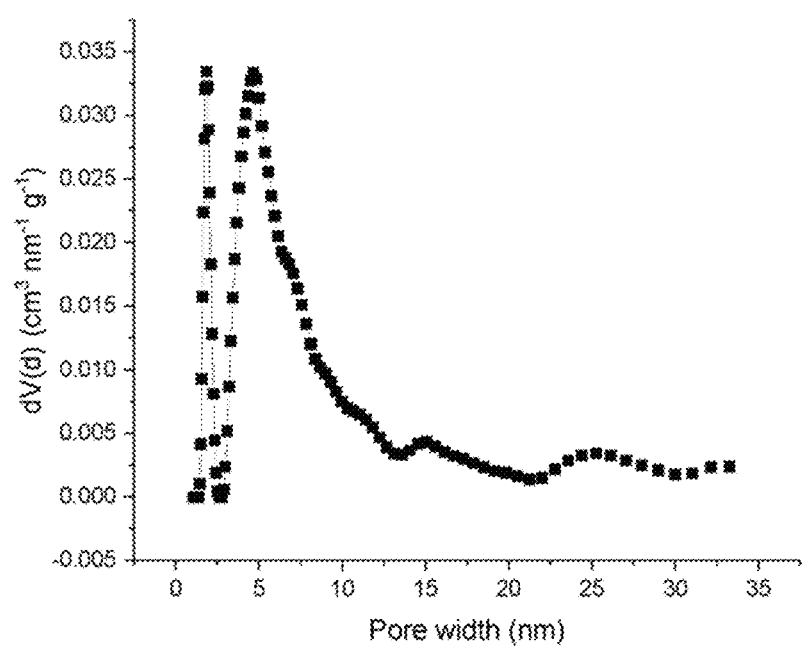
FIG. 21 illustrates a pore size distribution of porous γ-alumina nano-powder in Embodiment 7.

As can be seen from FIG. 20, the $\gamma$-$Al_2O_3$ powder remains well dispersed with no obvious grain growth occurring as the temperature continues to increase to 700° C.; the large particle size remains at around 300 nm and relatively abundant lamellar shaped particles exist; as shown in FIG. 21, the pore size is mainly around 2 and 6 nm.

The embodiments described above are only a description of the preferred way of the present application and are not intended to limit the scope of the present application. Without departing from the spirit of the design of the present application, all kinds of variations and improvements made to the technical solutions of the present application by persons of ordinary skill in the art shall fall within the scope of protection determined by the claims of the present application.

What is claimed is:

1. A method for preparing high-purity boehmite, comprising: adding aluminum isopropoxide into water and stirring the aluminum isopropoxide added water, then adding aluminum hydroxide into that stirred water, stirring that aluminum hydroxide added water to obtain a mixed system; carrying out hydrothermal reaction on the mixed system, performing centrifuging, washing, drying and crushing to the reacted mixed system, and obtaining high-purity boehmite;

wherein the aluminum isopropoxide, aluminum hydroxide and water are in a mass-volume ratio of (5-20) gram:30 gram:100 milliliter (mL); and the hydrothermal reaction is carried out at 170 degree Celsius (° C.) for 9 hours (h).

2. The method according to claim 1, wherein the aluminum isopropoxide is added into water and the aluminum isopropoxide added water is stirred for 3 hours (h) at room temperature; the aluminum hydroxide is added into that stirred water and that aluminum hydroxide added water is stirred for 1 h at room temperature.

3. The method according to claim 1, wherein the washing is to wash the reacted mixed system after centrifuging with deionized water to neutrality, and then wash the neutral mixed system with absolute ethanol for 1-2 times.

4. The method according to claim 1, wherein the drying is to dry a precipitate in a vacuum drying oven at 60° C., and then cool the precipitate to room temperature; the crushing is carried out by grinding the cooled precipitate in a mortar, with a particle size requirement of less than or equal to 5 percent (%) by mass of the material on a sieve when passing through a 100 mesh sieve.

* * * * *